(12) United States Patent
Iwamoto

(10) Patent No.: US 10,150,349 B2
(45) Date of Patent: Dec. 11, 2018

(54) VEHICLE TRAVELING CONTROL METHOD AND VEHICLE TRAVELING CONTROL DEVICE

(71) Applicant: NISSAN MOTOR CO., LTD., Kanagawa (JP)

(72) Inventor: Tadashi Iwamoto, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/756,894

(22) PCT Filed: Sep. 1, 2015

(86) PCT No.: PCT/JP2015/004445
§ 371 (c)(1),
(2) Date: Mar. 1, 2018

(87) PCT Pub. No.: WO2017/037761
PCT Pub. Date: Mar. 9, 2017

(65) Prior Publication Data
US 2018/0244131 A1    Aug. 30, 2018

(51) Int. Cl.
| | |
|---|---|
| B60H 1/08 | (2006.01) |
| B60H 1/00 | (2006.01) |
| F02D 29/02 | (2006.01) |
| F02D 41/12 | (2006.01) |
| B60H 1/04 | (2006.01) |
| F02D 41/08 | (2006.01) |
| F02N 11/08 | (2006.01) |
| F02D 41/02 | (2006.01) |
| F02D 41/06 | (2006.01) |
| F02D 41/24 | (2006.01) |

(52) U.S. Cl.
CPC ........... B60H 1/08 (2013.01); B60H 1/00735 (2013.01); B60H 1/00764 (2013.01); B60H 1/00807 (2013.01); B60H 1/04 (2013.01); F02D 29/02 (2013.01); F02D 41/083 (2013.01); F02D 41/12 (2013.01); F02D 41/123 (2013.01); F02N 11/084 (2013.01); B60Y 2300/192 (2013.01); F02D 41/0215 (2013.01); F02D 41/065 (2013.01); F02D 41/2422 (2013.01); F02D 2200/0416 (2013.01); F02D 2200/50 (2013.01); F02D 2400/12 (2013.01)

(58) Field of Classification Search
CPC .. B60H 1/08; B60H 1/00764; B60H 1/00807; B60H 1/04; B60H 1/00735; F02D 41/12; F02D 29/02; F02D 41/083; F02D 2200/50; F02N 11/084; B60Y 2300/192
USPC .......................................................... 701/36
See application file for complete search history.

(56) References Cited

U.S. PATENT DOCUMENTS

2012/0109480 A1* 5/2012 Morimura ........... B60W 10/026
                                                      701/70

FOREIGN PATENT DOCUMENTS

| JP | H07-266932 A | 10/1995 |
|---|---|---|
| JP | H11-193866 A | 7/1999 |
| JP | 2014-092103 A | 5/2014 |

* cited by examiner

*Primary Examiner* — Marthe Y Marc-Coleman
(74) *Attorney, Agent, or Firm* — Osha Liang LLP

(57) ABSTRACT

A vehicle traveling control method includes starting, when a predetermined condition is satisfied, inertial traveling during which a vehicle travels while stopping fuel supply to an engine of the vehicle, measuring, from a start of the inertial traveling, a temperature decrease amount occurring in a heat exchanger for heating a cabin of the vehicle with heat generated by the engine, and stopping the inertial traveling when the temperature decrease amount is greater than a threshold.

5 Claims, 7 Drawing Sheets

VEHICLE TRAVELING CONTROL METHOD AND VEHICLE TRAVELING CONTROL DEVICE

BACKGROUND

Technical Field

The present invention relates to a vehicle traveling control method and a vehicle traveling control device.

Related Art

An automatic start/stop device is described in PTL 1, which device has a control means for not only controlling an engine so as to be automatically stopped when a predetermined automatic stop condition for deceleration status is satisfied, the condition being such that required torque is small with respect to running resistance during the operation of the engine, but also controlling a start clutch so as to be disconnected when a clutch disconnection condition is satisfied after the automatic stop of the engine.

CITATION LIST

Patent Literature

PTL 1: JP H07-266932 A

SUMMARY OF INVENTION

Air conditioning devices for vehicles are provided with a heat exchanger for heating the cabin of vehicles with heat generated by their engine. The temperature of the heat exchanger decreases when the engine stops, and rises when the engine restarts. Since vehicles capable of inertial traveling, with fuel supply to the engine stopped, stop their engine more frequently, the heat exchanger may tend to be damaged or to suffer the deterioration of the lifetime thereof owing to increase in the frequency of temperature increase/decrease of the heat exchanger.

One or more embodiments of the present invention suppresses, in a vehicle capable of inertial traveling, the breakage of the heat exchanger or the lifetime deterioration thereof owing to the temperature increase/decrease of the heat exchanger.

According to one or more embodiments of the present invention, there is provided a vehicle traveling control method including: starting, when a predetermined condition is satisfied, inertial traveling during which a vehicle travels while stopping fuel supply to an engine of the vehicle; measuring temperature decrease amount from start of the inertial traveling occurring in a heat exchanger for heating a cabin of the vehicle with heat generated by the engine; and stopping the inertial traveling when the temperature decrease amount is greater than a threshold.

One or more embodiments of the present invention is embodied and achieved by using elements and a combination thereof described in Claims. It is to be understood that both the above general description and the following detailed description are merely exemplary and explanatory and are not restrictive of the present invention as claimed.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment (Configuration)

Figure 1:
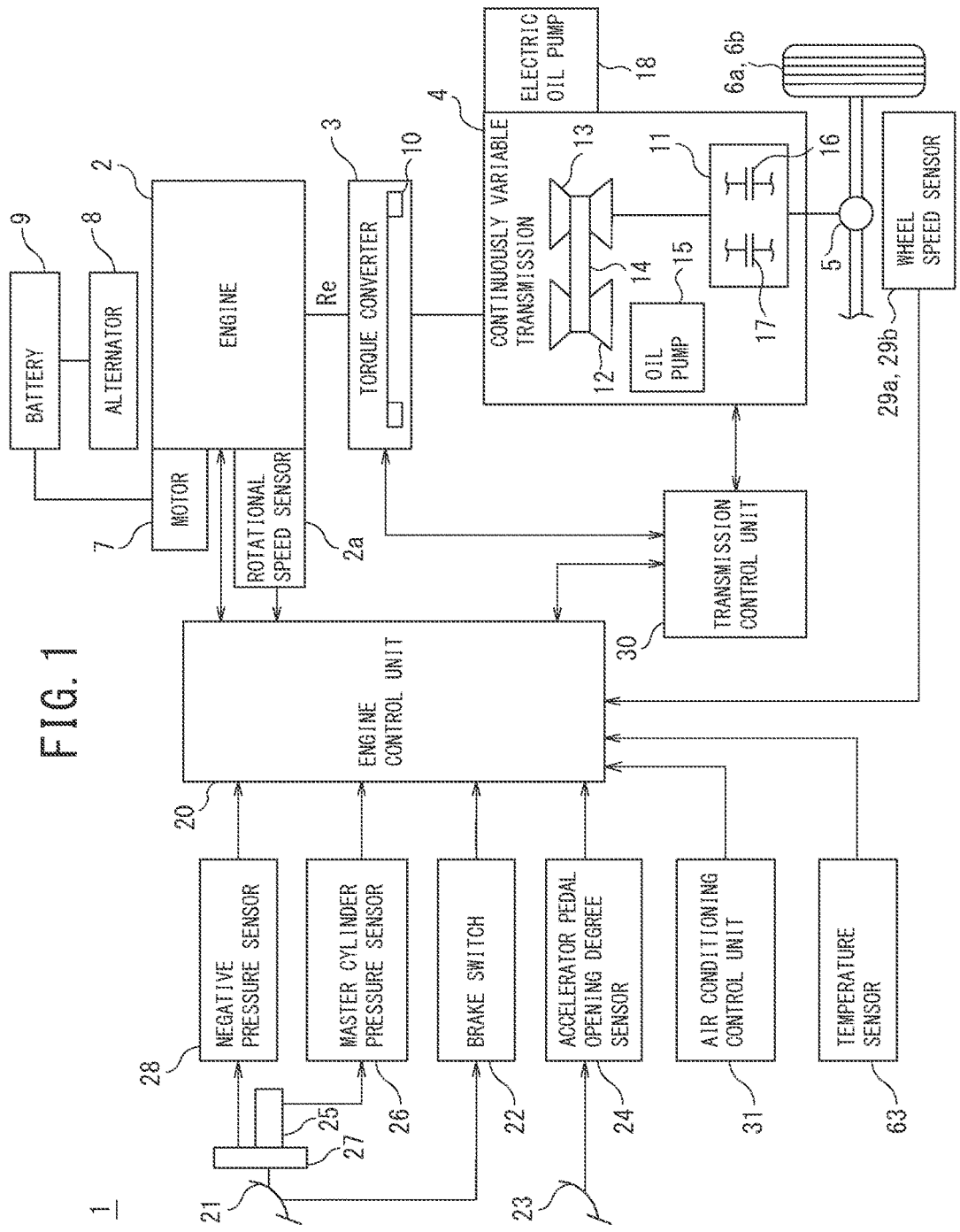
FIG. 1 is a schematic configuration diagram of a vehicle equipped with a vehicle traveling control device according to the first embodiment.

See FIG. 1. An engine 2 which is the internal combustion engine of a vehicle 1 is provided with a torque converter 3 on the output side of the engine. The torque converter 3 is connected to a belt type, continuously variable transmission 4 on the output side of the converter. The rotational driving force output from the engine 2 is input via the torque converter 3 to the continuously variable transmission 4, changed according to a desired gear ratio, and then transmitted via a differential gear 5 to drive wheels 6a and 6b. The engine 2 includes a motor 7 for starting the engine and an alternator 8 for generating electrical power.

The motor 7 may be, for example, a starter motor for engine start or an SSG (Separated Starter Generator) motor provided separately from the starter motor. The motor 7 is driven by using electrical power supplied by a battery 9 and cranks the engine on the basis of an engine start command. Further, when the engine 2 reaches its self-sustained rotation after fuel starts to be injected into the engine, the motor 7 is stopped. The alternator 8, rotationally driven by the engine 2, generates electrical power, which is supplied to a device such as the battery 9.

The torque converter 3 amplifies torque at low vehicle speed. The torque converter 3 has a lock-up clutch 10. When a vehicle speed is equal to or faster than a predetermined speed V1, the torque converter 3 engages the lock-up clutch 10, to regulate the relative rotation between the output shaft of the engine 2 and the input shaft of the continuously variable transmission 4. The predetermined speed V1 may be, for example, 14 km/h.

The continuously variable transmission 4 is provided with a forward-reverse switching mechanism 11, a primary pulley 12 and a secondary pulley 13, and a belt 14 set across the primary pulley 12 and the secondary pulley 13. The groove widths of the primary pulley 12 and the secondary pulley 13 are varied by hydraulic control, to achieve a desired gear ratio.

The forward-reverse switching mechanism 11 is provided with a forward clutch 16 and a reverse brake 17. The forward clutch 16 and the reverse brake 17 are frictionally engaging elements for transmitting rotation transmitted from the secondary pulley 13 in a positive direction (forward direction) and in a negative direction (reverse direction), respectively. The forward clutch 16 and the reverse brake 17 are examples of clutch which transmit the driving force of the engine 2 to the drive wheels 6a and 6b.

In addition, in the continuously variable transmission 4 is provided an oil pump 15 driven by the engine 2. When the engine is in operation, the oil pump 15, as a hydraulic source, supplies the converter pressure of the torque converter 3 and the clutch pressure of the lock-up clutch 10.

Further, the oil pump 15, as a hydraulic source, supplies the pulley pressure of the continuously variable transmission 4 and clutch engagement pressure for the forward clutch 16 and the reverse brake 17. Still further, the continuously variable transmission 4 is provided with an electric oil pump 18, in addition to the oil pump 15, and is configured so as to be capable of supplying necessary oil pressure to each actuator by activating the electric oil pump 18 when an automatic engine stop processing to be described later makes hydraulic supply by the oil pump 15 impossible. Thus, the leakage of hydraulic oil can be compensated and the clutch engagement pressure can be maintained even during engine stop.

The operation status of the engine 2 is controlled by an engine control unit 20. To the engine control unit 20 is input an accelerator pedal operation degree signal input from an accelerator pedal opening degree sensor 24 for detecting the operation degree of an accelerator pedal 23 operated by a driver. The accelerator pedal 23 is one example of an operation element operated by the driver to instruct the driving force of the vehicle 1.

Still further, to the engine control unit 20 is input wheel speed signals indicating wheel speeds detected by wheel speed sensors 29a and 29b provided on the drive wheels 6a and 6b. In the following explanation, the wheel speed sensors 29a and 29b may be collectively represented as "wheel speed sensors 29." The wheel speed sensors 29 may be provided on wheels other than the drive wheels. Hereinafter, the drive wheels 6a and 6b, and wheels other than the drive wheels may be collectively represented as "wheels 6."

Still further, to the engine control unit 20 is input a rotational speed signal indicating an engine rotational speed Re from a rotational speed sensor 2a for detecting the engine rotational speed Re of the engine 2.

Still further, to the engine control unit 20 are input signals for quantities such as cooling water temperature in the engine 2, intake air temperature of air supplied to the engine 2, air flow rate, absolute pressure in an intake manifold, and crank angle. Still further, to the engine control unit 20 is input a transmission status signal from a transmission control unit 30 to be described later.

The engine control unit 20 starts the engine 2 and controls the driving force of the engine 2, on the basis of the above-mentioned various signals. The engine control unit 20 calculates engine torque on the basis of the above-mentioned various signals and determines an engine torque command value on the basis of the calculation result. The engine control unit 20 controls the output torque of the engine 2 by controlling parameters such as intake air amount, fuel injection amount, and ignition timing, on the basis of the command value.

Further, to the engine control unit 20 is input a brake signal from a brake switch 22 for outputting an ON signal according to the operation of a brake pedal 21 by a driver. The brake pedal 21 is one example of a second operation element operated by a driver to instruct the braking force of the vehicle 1.

A master cylinder 25 and a master back 27 are provided ahead of the brake pedal 21. The master back 27 amplifies brake operation force with the aid of the intake negative pressure of the engine 2. To the engine control unit 20 is input a brake pedal operation degree signal from a master cylinder pressure sensor 26 for detecting the master cylinder pressure of the master cylinder 25 generated on the basis of the operation degree of the brake pedal 21. Further, to the engine control unit 20 is input a negative pressure signal from a negative pressure sensor 28 for detecting the negative pressure of the master back 27.

Another sensor, such as a sensor for detecting brake pedal stroke degree and brake pedal depression force or a sensor for detecting wheel cylinder pressure may be used, instead of the master cylinder pressure sensor 26, to detect the brake pedal operation degree, which is input to the engine control unit 20.

On the other hand, the transmission control unit 30 receives an engine status signal indicating the engine operation status from the engine control unit 20 and sends a transmission status signal indicating the status of the continuously variable transmission 4 to the engine control unit 20. The transmission control unit 30 controls, for example, the gear ratio of the continuously variable transmission 4, according to these signals and the position of a shift lever.

For example, the transmission control unit 30, when D-range is selected, connects the forward clutch 16, and further determines the gear ratio from a gear ratio map on the basis of the accelerator pedal opening degree and the vehicle speed, to control each pulley pressure.

In the following explanation, a representation "D-range traveling" means forward traveling during which the vehicle 1 travels, with the forward clutch 16 kept connected by the selection of D-range and fuel kept supplied to the engine 2.

Further, when the vehicle speed is less than the predetermined speed V1, the lock-up clutch 10 is released, but when the vehicle speed is equal to or more than the predetermined speed V1, the lock-up clutch is connected such that the engine 2 and the continuously variable transmission 4 are directly connected.

Figure 2:
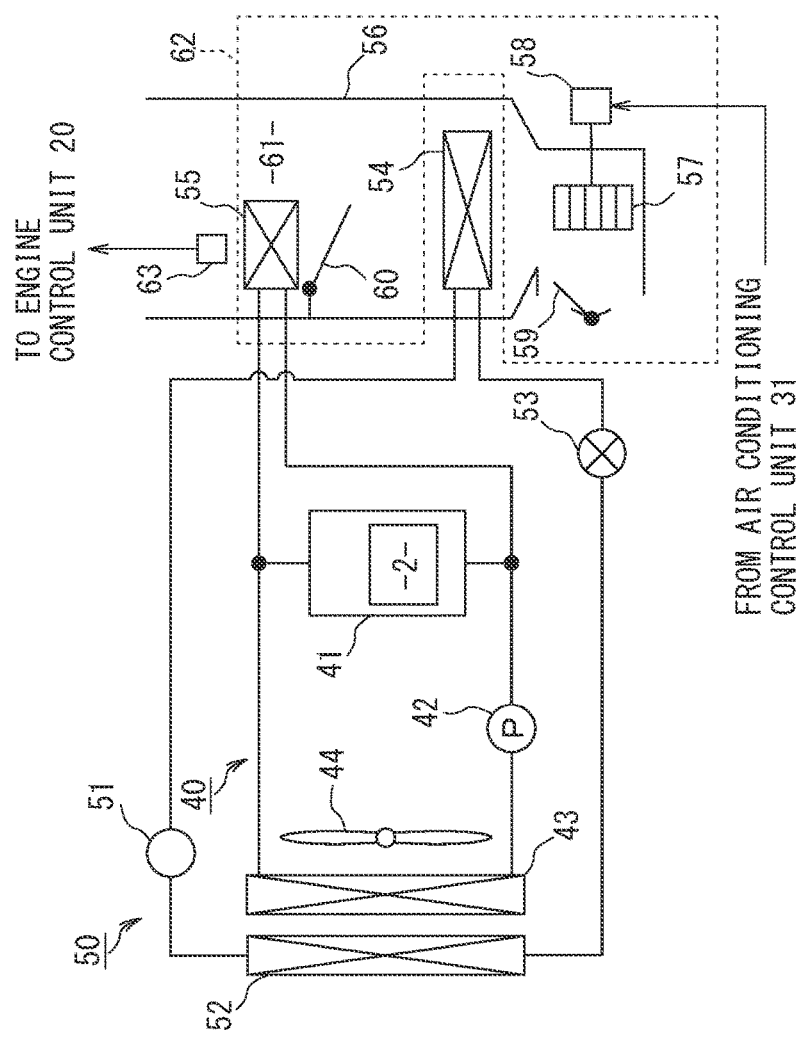
FIG. 2 is a schematic configuration diagram of an engine cooling device and an air conditioning device of the vehicle equipped with the vehicle traveling control device according to the first embodiment.
Figure 3:
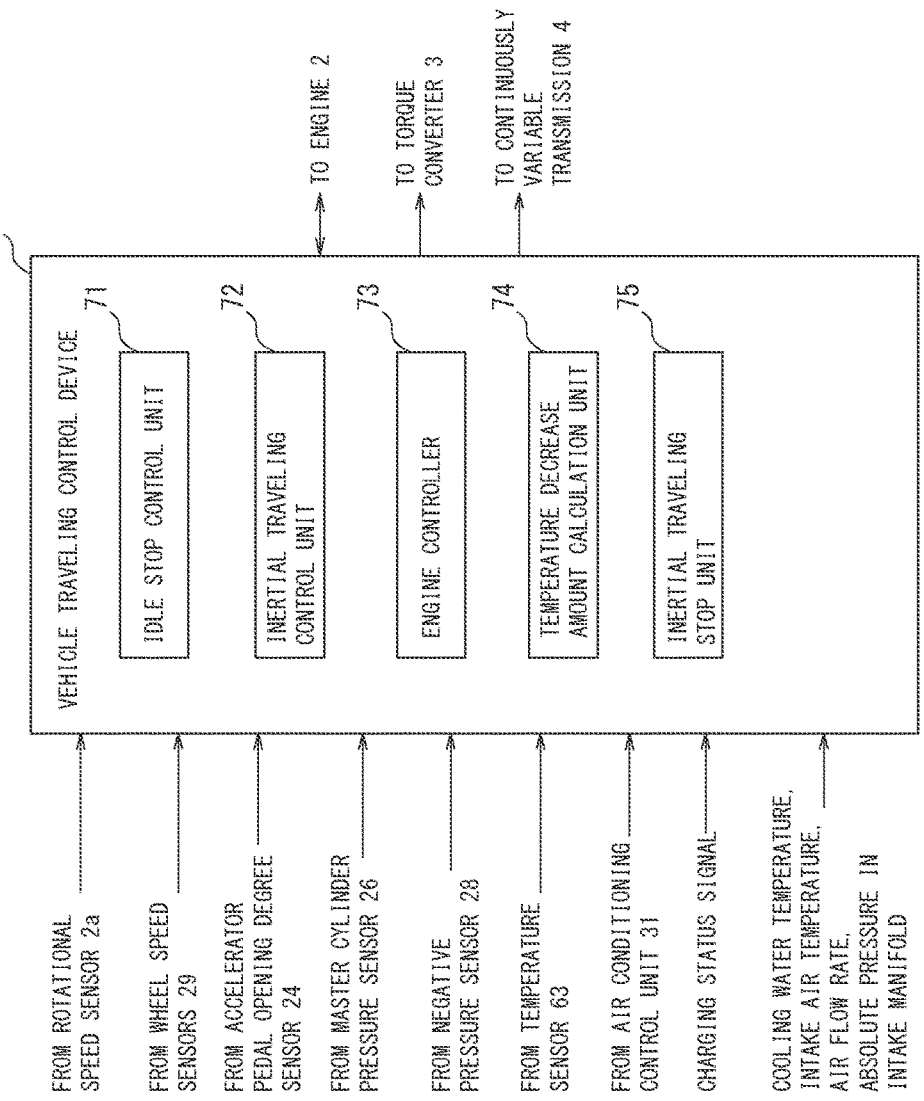
FIG. 3 is a functional configuration diagram of the vehicle traveling control device according to the first embodiment.

Next, an engine cooling device for cooling the engine 2 and an air conditioning device for adjusting temperature in the cabin of the vehicle 1 will be explained. See FIG. 2. The vehicle 1 is provided with an engine cooling device 40 and an air conditioning device 50.

The engine cooling device 40 is a device for cooling the engine 2 used as a driving source of the vehicle, and is provided with a cooling cycle which connects, by a cooling water piping, a water jacket 41 in contact with a heat generation part of the engine 2, a water pump 42 for circulating cooling water, which is a cooling medium for the engine 2, through the water jacket 41, and a radiator 43 for cooling the cooling water.

In addition, the cooling cycle is further provided with a fan 44 for enhancing heat exchange on the radiator 43. The water pump 42 and the fan 44 are respectively driven by a motor which is not depicted.

In the engine cooling device 40, the cooling water cooled by the radiator 43 is circulated to the water jacket 41 in contact with a heat generation part of the engine 2 and cools the engine 2, and the cooling water warmed through heat exchange with heat generated by the engine 2 is sent by the water pump 42 to the radiator 43 to be cooled by heat exchange with running wind and/or air passing through the radiator 43 with the aid of the fan 44, and then the cooled cooling water is returned to the water jacket 41 of the engine 2.

The air conditioning device 50 is provided with a heat pump cycle configured by a compressor 51, an outdoor heat exchanger (condenser) 52, an expansion valve 53, and an evaporator (evaporation device) 54, connected in this order by a cooling piping. In addition, the air conditioning device 50 is provided with a heater core (indoor heat exchanger) 55 that is heated by cooling water warmed by the engine 2, and heats the cabin of the vehicle 1 with heat generated by the engine 2.

In the cabin, an air conditioning unit case 56 is provided, for example, along the sideward direction of a dash panel, and a blower 57 rotated by a fan motor 58, the evaporator 54, and the heater core 55 are provided in the air conditioning unit case 56.

At the air intake of the blower 57, an intake door 59 for switching outdoor air and indoor air is pivotally provided, so as to be able to switch modes for introducing indoor air and outdoor air.

The evaporator 54 is provided downstream of the blower 57 of the air conditioning unit case 56, and outdoor air or indoor air introduced by the blower 57 all passes through the evaporator 54. However, when heating is performed by the air conditioning device 50 as will be described later, since a cooling medium does not circulate through the evaporator 54, the sucked air will pass through the evaporator, with no heat exchange.

At the downstream of the evaporator 54 of the air conditioning unit case 56 is provided the heater core 55, in front of which is pivotally provided a temperature control door 60. A bypass 61 through which air flowing downstream bypasses the heater core 55 is provided on the side part of the heater core 55, and the ratio of air amount through the heater core 55 to that through the bypass 61 is controlled by controlling the opening degree of the temperature control door 60, and thereby the temperature of conditioned air to be supplied to the cabin is controlled.

On the other hand, the compressor 51, the outdoor heat exchanger 52, the expansion valve 53, and the main part of the cooling piping are arranged in the engine room in the front the vehicle. Among them, the radiator 43 of an engine cooling device 40 to be described later is arranged in the rear part of the outdoor heat exchanger 52.

When the cabin is heated by the air conditioning device 50, cooling water in the engine cooling device 40, warmed by the engine 2, is made flow into the heater core 55 and circulates between the heater core 55 and the water jacket 41. In the heater core 55, heat exchange occurs between this cooling water and air introduced into the heater core 55 by the blower 57, to generate conditioned wind for air-conditioning the cabin, into which the conditioned wind introduced.

The heater core 55, the blower 57, the fan motor 58, the intake door 59, and the temperature control door 60 configure a heater 62 for heating the cabin.

Further, when the cabin is cooled by the air conditioning device 50, a cooling medium at high temperature and high pressure owing to compression by the rotational drive of the compressor 51 is sent to the outdoor heat exchanger 52. Heat exchange occurs between this cooling medium and air introduced into the outdoor heat exchanger 52 (running wind or air sucked by the fan 44), and thereby the cooling medium is cooled and liquefied. The liquefied cooling medium is rapidly depressurized into a form of misty cooling medium at low temperature and pressure by the expansion valve 53 and sent to the evaporator 54, and heat exchange occurs between the misty cooling medium at low temperature and pressure passing through the evaporator 54 and air introduced into the evaporator 54 by the blower 57, to cool and dehumidify the air passing through the evaporator 54.

See FIG. 1. The vehicle 1 is provided with an air conditioning control unit 31 for controlling the operation of the air conditioning device 50. The air conditioning control unit 31 operates the air conditioning device 50 as a heating device, on the basis of the operation status of a temperature control dial provided on the instrument panel in the cabin. In other words, it turns on the heater 62.

Further, the air conditioning control unit 31 operates the air conditioning device 50 as a cooling device or stops it, on the basis of the operation status of the temperature control dial. In other words, it turns off the heater 62.

Further, the air conditioning control unit 31 controls the air flow rate of the blower 57 according to the operation status of a fan switch provided, for example, on the instrument panel in the cabin.

The air conditioning control unit 31 inputs an air conditioning signal indicating the operation status of the air conditioning device 50 to the engine control unit 20. The air conditioning signal may include, for example, signals indicating whether or not the air conditioning device 50 is in operation and indicating whether it operates as a heating device or as a cooling device.

In addition, a heater core temperature signal from a temperature sensor 63 for detecting the temperature of the heater core 55 is input to the engine control unit 20. The temperature sensor 63 may detect the temperature of cooling water at the outlet of the heater core 55 instead of directly detecting the temperature of the heater core 55.

The engine control unit 20, the transmission control unit 30, and the air conditioning control unit 31 may be, for example, computers including a CPU (Central Processing Unit) and a peripheral component for CPU such as a storage device. Respective functions of these computers described herein are implemented by respective CPUs executing computer programs stored in storage devices.

(Automatic Stop Processing of Engine)

Next, automatic stop processing of the engine 2 will be explained. The automatic stop processing is a processing which stops the engine 2 automatically and restarts it when a predetermined condition is satisfied.

The engine control unit 20 performs automatic stop processing on the basis of the wheel speed signals from wheel speed sensors 29, an accelerator pedal operation degree signal from accelerator pedal opening degree sensor 24, the brake pedal operation degree signal from the master cylinder pressure sensor 26, the negative pressure signal from the negative pressure sensor 28, a charging status signal of battery 9, the air conditioning signal from the air conditioning control unit 31, and the heater core temperature signal from the temperature sensor 63.

The engine control unit 20, the transmission control unit 30, and the temperature sensor 63 configure a vehicle traveling control device 70 for performing the automatic stop processing of the engine 2.

Figure 4:
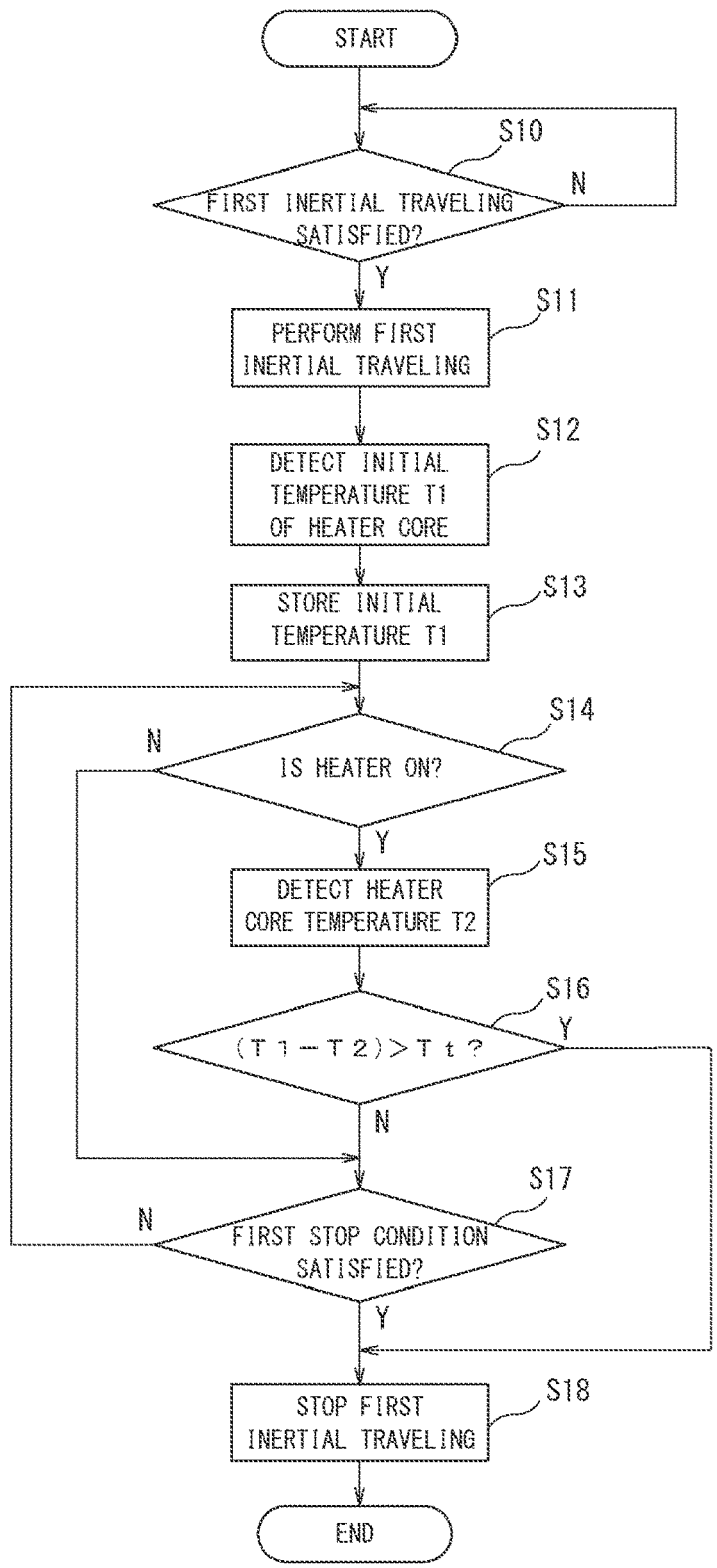
FIG. 4 is a flowchart explaining a processing example by the vehicle traveling control device according to the first embodiment.

FIG. 4 illustrates the functional configuration of the vehicle traveling control device 70. The vehicle traveling control device 70 is provided with an idle stop control unit 71, an inertial traveling control unit 72, an engine controller 73, a temperature decrease amount calculation unit 74, and an inertial traveling stop unit 75.

The idle stop control unit 71 performs so-called idle stop (also called idle reduction) control which stops engine idling when a predetermined condition is satisfied while the vehicle 1 is stopped. A detailed description of the idle stop control is omitted.

The inertial traveling control unit 72 stops fuel supply to the engine 2, disconnects the engine 2 from the drive wheels 6a and 6b, and run the vehicle 1 as is when a predetermined first inertial traveling condition is satisfied even if the speed V is equal to or faster than a speed threshold V2 which is faster than the predetermined speed V1. A representation "first inertial traveling" herein means traveling during which the speed V is equal to or faster than the speed threshold V2, fuel supply to the engine 2 is kept stopped, and the engine 2 is kept disengaged from the drive wheels 6a and 6b.

The inertial traveling control unit 72 receives the wheel speed signals from the wheel speed sensors 29, the accelerator pedal operation degree signal from the accelerator pedal opening degree sensor 24, the brake pedal operation degree signal from the master cylinder pressure sensor 26, the negative pressure signal from the negative pressure sensor 28, and the charging status signal from the battery 9. The inertial traveling control unit 72 determines whether or not a first inertial traveling condition is satisfied, on the basis of the wheel speed signals, the accelerator pedal operation degree signal, and the charging status signal.

The first inertial traveling condition is satisfied, for example, when all of the following four conditions (A1) to (A4) are satisfied.

(A1) The speed V is equal to or faster than the speed threshold V2. The speed threshold V2 may be about 30 km/h.

(A2) The speed V is equal to or slower than a speed V3. For example, the speed V3 may be about 80 km/h.

(A3) The driver has no intention for acceleration. For example, when a time equal to longer than a predetermined time elapses after accelerator operation degree (i.e., accelerator depression degree) drops to zero, the condition (A3) may be determined to be satisfied. The predetermined time is a period during which the accelerator pedal 23 is not operated, the period being set in order to determine that the driver has no intention for acceleration, and it may be, for example, 2 seconds.

(A4) A predetermined idle stop permission condition is satisfied. The idle stop permission condition may be, for example, that the engine is not under warming-up, and that the charging ratio of the battery 9 is equal to or higher than a predetermined value.

The inertial traveling control unit 72 permits the first inertial traveling and outputs an engine stop command to the engine controller 73 when the first inertial traveling condition is satisfied, in other words, when the driver has no intention for acceleration and other conditions (A1), (A2), and (A4) are satisfied.

The engine controller 73 stops fuel injection by the fuel injection device, to stop fuel supply to the engine 2. Further, the engine controller 73 outputs an operation prohibition command for the electric oil pump 18 to the continuously variable transmission 4. Since the oil pump 15 is stopped owing to the stop of the engine 2, and in addition, the electric oil pump 18 does not operate, the forward clutch 16 in the forward-reverse switching mechanism 11 is released. As a result, the engine 2 is disengaged from the drive wheels 6a and 6b. In addition, the lock-up clutch 10 is also released.

Since the water pump 42 for circulating cooling water of the engine cooling device 40 stops during the first inertial traveling, cooling water warmed by the engine 2 will not flow into the heater core 55. Therefore, when the first inertial traveling starts, the temperature of the heater core 55 decreases. On the other hand, when the first inertial traveling ends and D-range traveling starts, the engine 2 restarts and cooling water warmed by the engine 2 flows into the heater core 55, to increase the temperature of the heater core 55.

When large temperature change occurs in the heater core 55 owing to the stop and restart of the engine, large thermal expansion and large thermal shrinkage occur, resulting in thermal distortion in parts of the heater core 55, which is a factor causing the breakage of the heater core 55. Therefore, the first inertial traveling which increases the frequency of stopping the engine 2 is a factor of shortening the period until the heater core 55 is broken.

On the other hand, the smaller the temperature change of the heater core 55 owing to the engine stop and restart is, the more frequently the engine 2 can be stopped until the heater core 55 is broken.

Therefore, the vehicle traveling control device 70 stops the first inertial traveling when a temperature decrease amount $\Delta T$ occurring in the heater core 55 after the start of the first inertial traveling is larger than a predetermined threshold Tt. As described above, the breakage of the heater core 55 caused by temperature change occurring in the heater core 55 can be reduced by reducing the temperature change of the heater core 55 owing to the first inertial traveling.

The temperature decrease amount calculation unit 74 receives a heater core temperature signal from the temperature sensor 63. During the first inertial traveling, the temperature decrease amount calculation unit 74 measures the temperature decrease $\Delta T$ occurring in the heater core 55 after the start of the first inertial traveling. For example, the temperature decrease amount calculation unit 74 detects and stores an initial temperature T1 of the heater core 55 immediately after the start of the first inertial traveling, on the basis of the heater core temperature signal. When the temperature of the heater core 55 at the start of the first inertial traveling is approximately constant and can be estimated, the estimated known temperature may be used as the initial temperature T1. In this case, measurement and storage of the initial temperature T1 is unnecessary.

During the first inertial traveling, the temperature decrease amount calculation unit 74 detects a temperature T2 of the heater core 55 at a predetermined cycle, on the basis of the heater core temperature signal. The predetermined cycle may be, for example, 100 msec. The temperature decrease amount calculation unit 74 calculates a difference (T1−T2) obtained by subtracting the temperature T2 from the initial temperature T1 as a temperature decrease amount $\Delta T$.

The inertial traveling stop unit 75 receives the air conditioning signal from the air conditioning control unit 31. The inertial traveling stop unit 75 determines whether or not the heater 62 is in an ON-status, on the basis of the air conditioning signal. When the heater 62 is in the ON-status, the inertial traveling stop unit 75 determines whether or not the temperature decrease amount $\Delta T$ is larger than the threshold Tt. When the temperature decrease amount $\Delta T$ is larger than the threshold Tt, the inertial traveling stop unit 75 stops the first inertial traveling.

When the temperature decrease amount ΔT is equal to or less than the threshold Tt, the inertial traveling stop unit 75 does not stop the first inertial traveling.

When the inertial traveling stop unit 75 stops the first inertial traveling, it outputs a restart command to the engine controller 73. Upon receiving the restart command, the engine controller 73 restarts fuel injection and drive the motor 7 to perform engine cranking. After the engine 2 is restarted, the oil pump 15 operates to connect the forward clutch 16 in the forward-reverse switching mechanism 11.

Thus, engine restart and reconnection of the forward clutch 16 are completed, and the traveling status of vehicle 1 is shifted from the first inertial traveling to D-range traveling.

Further, during the first inertial traveling, the inertial traveling control unit 72 determines whether or not a predetermined first stop condition is satisfied, on the basis of the wheel speed signals, the accelerator pedal operation degree signal, and the charging status signal. When the first stop condition is satisfied, the inertial traveling control unit 72 prohibits the first inertial traveling, to stop the first inertial traveling. The first stop condition is satisfied when, for example, anyone of the following three conditions (B1) to (B3) is satisfied.

(B1) The speed V is slower than the speed threshold V2.

(B2) The driver has an intention for acceleration. For example, the condition (B2) may be determined to be satisfied when the accelerator pedal 23 is depressed.

(B3) The idle stop permission condition is not satisfied.

When the first inertial traveling is stopped, the inertial traveling control unit 72 outputs a restart command to the engine controller 73.

Next, when it is determined that the vehicle 1 is under deceleration and likely to stop via control called "deceleration-and-fuel-cut control" and to transfer to the idling stop control, fuel supply to the engine 2 is stopped. In this case, the vehicle 1 is traveling inertially, with the accelerator pedal 23 not operated by the driver. A representation "second inertial traveling" means inertial traveling during which fuel supply to the engine 2 is kept stopped when it is determined that the vehicle is likely to transfer to the idling stop control. The first inertial traveling and the second inertial traveling may be collectively represented as "inertial traveling." The second inertial traveling may be called coast stop traveling, and a control for stopping fuel supply to the engine 2 during the coast stop traveling may be called coast stop control.

Although fuel injection is kept stopped during the deceleration-and-fuel-cut control, the engine rotational speed Re is maintained by coast torque transmitted via the lock-up clutch 10 from the drive wheels 6a and 6b. However, since the lock-up clutch 10 is released after deceleration down to the predetermined speed V1, the engine 2 will be stopped if no fuel is injected thereto. For this reason, in conventional technologies, the deceleration-and-fuel-cut control is stopped at a timing of releasing the lock-up clutch 10, and fuel injection is restarted to maintain self-sustained engine rotation; then, the engine idling is stopped after the vehicle 1 was completely stopped. However, fuel efficiency can be improved if the amount of fuel upon the restart of fuel injection can be further reduced in a process in which fuel injection is temporarily restarted after such a traveling status with fuel injection kept stopped and then the engine is stopped again. Accordingly, when a predetermined second inertial traveling condition is satisfied, the engine 2 is kept stopped without restarting fuel injection, and after the vehicle 1 is stopped, it transfers directly to the normal idling stop control.

The inertial traveling control unit 72 determines whether or not the second inertial traveling condition is satisfied, on the basis of the accelerator pedal operation degree signal, the brake pedal operation degree signal, and the charging status signal. The second inertial traveling condition is satisfied, for example, when all of the following three conditions (C1) to (C3) are satisfied.

(C1) The brake pedal operation degree is equal to or greater than a predetermined value.

(C2) The accelerator pedal operation degree is zero.

(C3) The idle stop permission condition is satisfied.

When the second inertial traveling condition is satisfied, the inertial traveling control unit 72 outputs the engine stop command to the engine controller 73. Upon the automatic stop of the engine 2, the continuously variable transmission 4 activates the electric oil pump 18, to maintain the engagement of the forward clutch 16 of the forward-reverse switching mechanism 11. Thus, the engagement of the engine 2 with the drive wheels 6a and 6b is maintained. Since the second inertial traveling starts after the deceleration-and-fuel-cut control, the speed V during the second inertial traveling is slower than the predetermined speed V1.

During the second inertial traveling, the inertial traveling control unit 72 determines whether or not a predetermined second stop condition is satisfied, on the basis of the negative pressure signal and the charging status signal. When the second stop condition is satisfied, the inertial traveling control unit 72 prohibits the second inertial traveling and stops the second inertial traveling. The second stop condition is satisfied, for example, when any one of the following two conditions (D1) and (D2) is satisfied.

(D1) The negative pressure of the master back 27 is less than a predetermined value.

(D2) The idle stop permission condition is not satisfied.

When the second stop condition is satisfied, the inertial traveling control unit 72 outputs the restart command to the engine controller 73.

Also during the second inertial traveling, the temperature decrease amount calculation unit 74 may measure the temperature decrease amount ΔT occurring in the heater core 55 after the start of the second inertial traveling. When the temperature decrease amount ΔT is larger than the threshold Tt, the inertial traveling stop unit 75 may stop the second inertial traveling.

As described above, the vehicle traveling control device 70 can reduce the breakage or the lifetime deterioration of the heater core 55 owing to the temperature change of the heater core 55 associated with the first inertial traveling and the second inertial traveling, while improving the fuel efficiency of the vehicle 1 by increasing occasions of engine stop owing to the first inertial traveling and the second inertial traveling.

(Operation)

Next, one example of the processing of the vehicle traveling control device 70 according to the first embodiment will be explained. See FIG. 4.

In a step S10, the inertial traveling control unit 72 determines whether or not the first inertial traveling condition is satisfied. When the first inertial traveling condition is satisfied (step S10: Y), the processing goes to a step S11. When the inertial traveling condition is not satisfied (step S10: N), the inertial traveling control unit 72 does not permit the start of the first inertial traveling and makes the processing return to the step S10.

In the step S11, the inertial traveling control unit 72 outputs the engine stop command to the engine controller 73, to start the first inertial traveling.

In a step S12, the temperature decrease amount calculation unit 74 detects the initial temperature T1 of the heater core 55 immediately after the start of the first inertial traveling. In a step S13, the temperature decrease amount calculation unit 74 stores the initial temperature T1. When the temperature of the heater core 55 at the start of the first inertial traveling is approximately constant and can be estimated, the estimated known temperature may be used as the initial temperature T1. In this case, the steps S12 and S13 may be omitted.

In a step S14, the inertial traveling stop unit 75 determines whether or not the heater 62 is in an ON-status. When the heater 62 is in the ON-status (step S14: Y), the processing goes to a step S15. When the heater 62 is not in the ON-status (step S14: N), the processing goes to a step S17.

In a step S15, the temperature decrease amount calculation unit 74 detects the temperature T2 of the heater core 55. The temperature decrease amount calculation unit 74 calculates the temperature decrease amount $\Delta T$ (=T1−T2).

In a step S16, the inertial traveling stop unit 75 determines whether or not the temperature decrease amount $\Delta T$ is larger than the threshold Tt. When the temperature decrease amount $\Delta T$ is larger than the threshold Tt (step S16: Y), the processing goes to a step S18. When the temperature decrease amount $\Delta T$ is equal to or less than the threshold Tt (step S16: N), the processing goes to the step S17.

In the step S17, the inertial traveling control unit 72 determines whether or not the first stop condition is satisfied. When the first stop condition is satisfied (step S17: Y), the processing goes to a step S18. When the first stop condition is not satisfied (step S17: N), the processing returns to the step S14.

In the step S18, the restart command is output to the engine controller 73. As a result, the first inertial traveling is stopped and D-range traveling is started. Then the processing ends.

When the first inertial traveling condition is satisfied, the inertial traveling control unit 72 starts the first inertial traveling during which a vehicle travels while stopping fuel supply to the engine 2. The temperature decrease amount calculation unit 74 measures the temperature decrease amount $\Delta T$ from the start of the first inertial traveling occurring in the heater core 55 which heats the cabin of the vehicle 1 with heat generated by the engine 2. The inertial traveling stop unit 75 stops the first inertial traveling when the temperature decrease amount $\Delta T$ is greater than the threshold Tt.

Therefore, even if the engine 2 is stopped more frequently owing to the first inertial traveling, the breakage of the heater core 55 caused by temperature change occurring in the heater core 55 can be reduced by suppressing the temperature change of the heater core 55 owing to the first inertial traveling.

Modified Example (1) The more abrupt the temperature decrease occurring in the heater core 55 after the first inertial traveling is, the more likely the thermal distortion is to occur in parts of the heater core 55 and the breakage of the heater core 55 is to occur. Therefore, when the temperature decrease is abrupt, the threshold Tt may be changed to facilitate the first inertial traveling to be stopped, thereby reducing thermal distortion of parts of the heater core 55 and the breakage of the heater core 55 owing to the abrupt temperature decrease.

Figure 5:
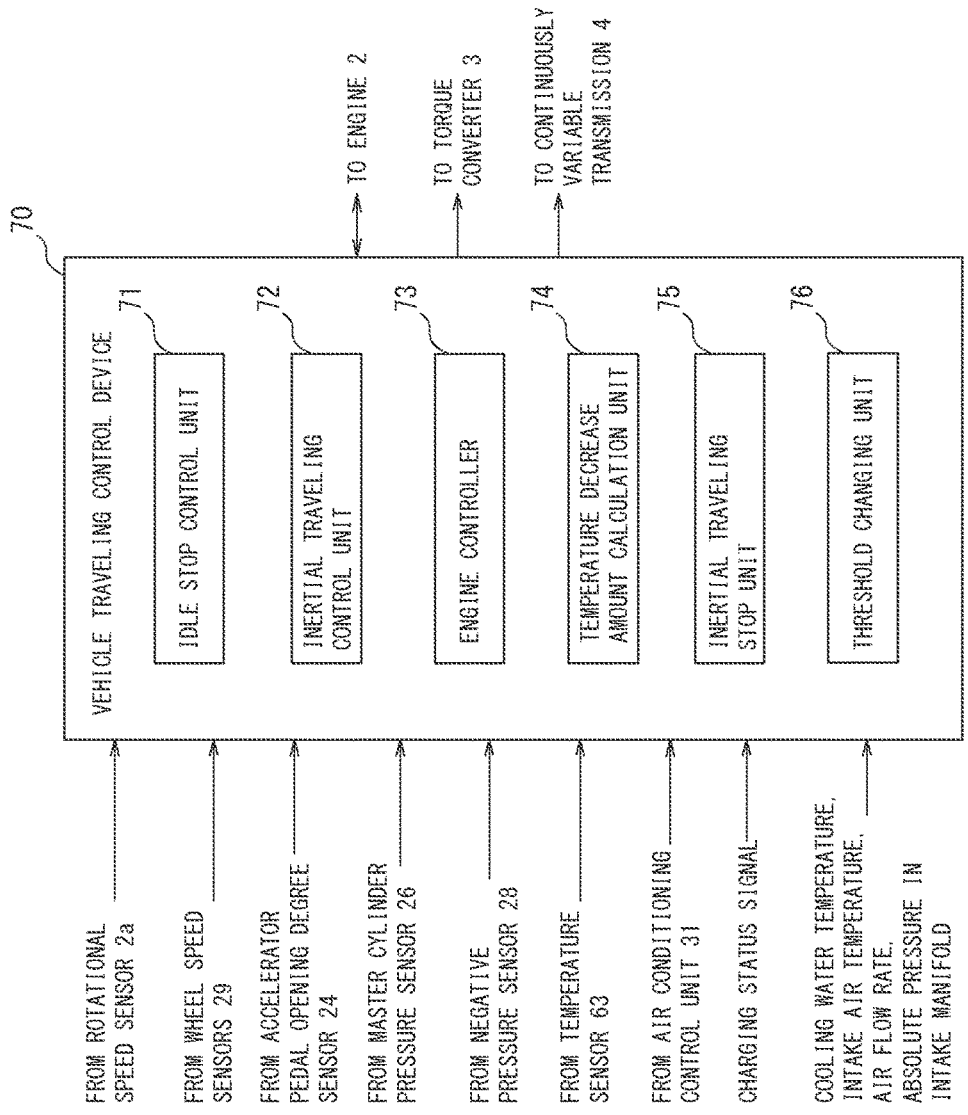
FIG. 5 is a functional configuration diagram of a vehicle traveling control device according to modified example.

See FIG. 5. The same reference signs are used for similar components as those in the first embodiment. The vehicle traveling control device 70 is provided with a threshold changing unit 76.

The threshold changing unit 76 changes the threshold Tt according to the decrease rate of temperature of the heater core 55. For example, the threshold changing unit 76 decreases the threshold Tt with increase in the decrease rate.

(2) The larger the cumulative number of stops of the engine 2 is, the more the thermal distortion of parts of the heater core 55 generated owing to the stop and restart of the engine 2 is accumulated, leading to the breakage of the heater core 55. Therefore, according to the largeness of the cumulative number of stops of the engine 2, the threshold Tt may be changed to facilitate the first inertial traveling to be stopped, thereby reducing the breakage of parts of the heater core 55 exhibiting the accumulated thermal distortion.

The threshold changing unit 76 changes the threshold Tt according to the cumulative number of stops of the engine 2. For example, the threshold changing unit 76 decreases the threshold Tt with increase in the cumulative number of stops of engine 2.

(3) The vehicle traveling control device 70 can also be applied to vehicles adopting an automatic transmission of a type other than the continuously variable transmission 4. For example, the vehicle traveling control device 70 can also be applied to vehicles adopting an automatic transmission of a type with a gear pair with parallel axis. Further, the vehicle traveling control device 70 can be applied not only to vehicles provided with only an internal combustion engine as a driving source, but also to hybrid vehicles.

(4) During the first inertial traveling, the vehicle traveling control device 70 may output, to the continuously variable transmission 4, a release signal for actively releasing the forward clutch 16, instead of the operation prohibition command for the electric oil pump 18.

Second Embodiment

Next, the second embodiment will be explained. The vehicle traveling control device 70 according to the second embodiment measures the temperature decrease amount $\Delta T$ occurring in the heater core 55, on the basis of not only the air flow rate of the blower 57 sucking air into the air conditioning unit case 56 which houses the heater core 55 but also the temperature of the air sucked by the blower 57 into the air conditioning unit case 56. As a result, a dedicated sensor for measuring directly the temperature of the heater core 55 is not required, and therefore, increase in manufacturing costs associated with the additional dedicated sensor can be avoided.

Figure 6:
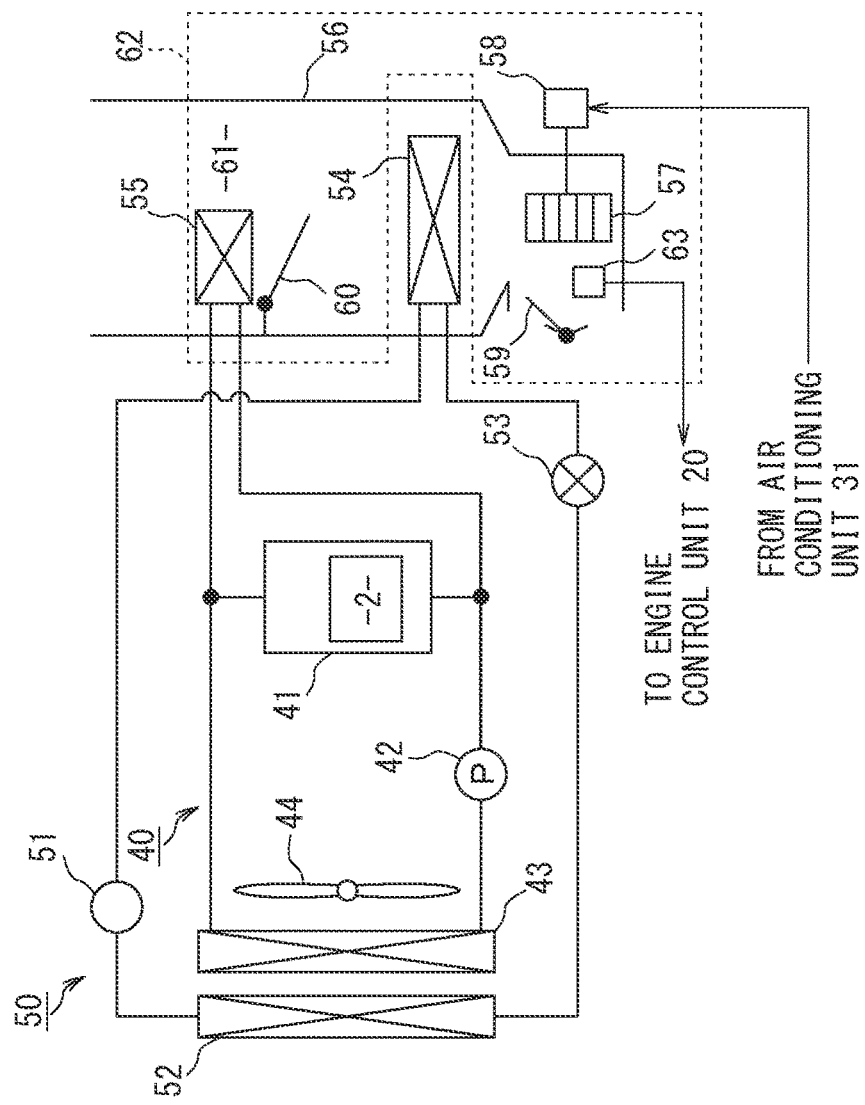
FIG. 6 is a schematic configuration diagram of an engine cooling device and an air conditioning device of a vehicle equipped with a vehicle traveling control device according to the second embodiment.

See FIG. 6. The second embodiment has the similar configuration as that of the first embodiment except for a temperature sensor 63. The temperature sensor 63 detects the temperature Ta of air sucked into the air conditioning unit case 56 by the blower 57. The temperature sensor 63 outputs, to the engine control unit 20, an intake air temperature signal indicating the temperature Ta of the intake air.

Further, the air conditioning control unit 31 for controlling an air flow rate Av of the blower 57 outputs, to the engine control unit 20, an air flow rate signal indicating the air flow rate Av.

The temperature decrease amount calculation unit 74 measures the temperature decrease amount $\Delta T$ occurring in the heater core 55, on the basis of the temperature Ta of the intake air and the air flow rate Av of the blower 57. For example, the temperature decrease amount calculation unit 74 may calculate the temperature decrease amount ΔT occurring in the heater core 55, by referring to a map indicating a relation between elapsed time from the start of the first inertial traveling and the temperature decrease amount ΔT, at a specific temperature Ta and a specific air flow rate Av.

Figure 7:
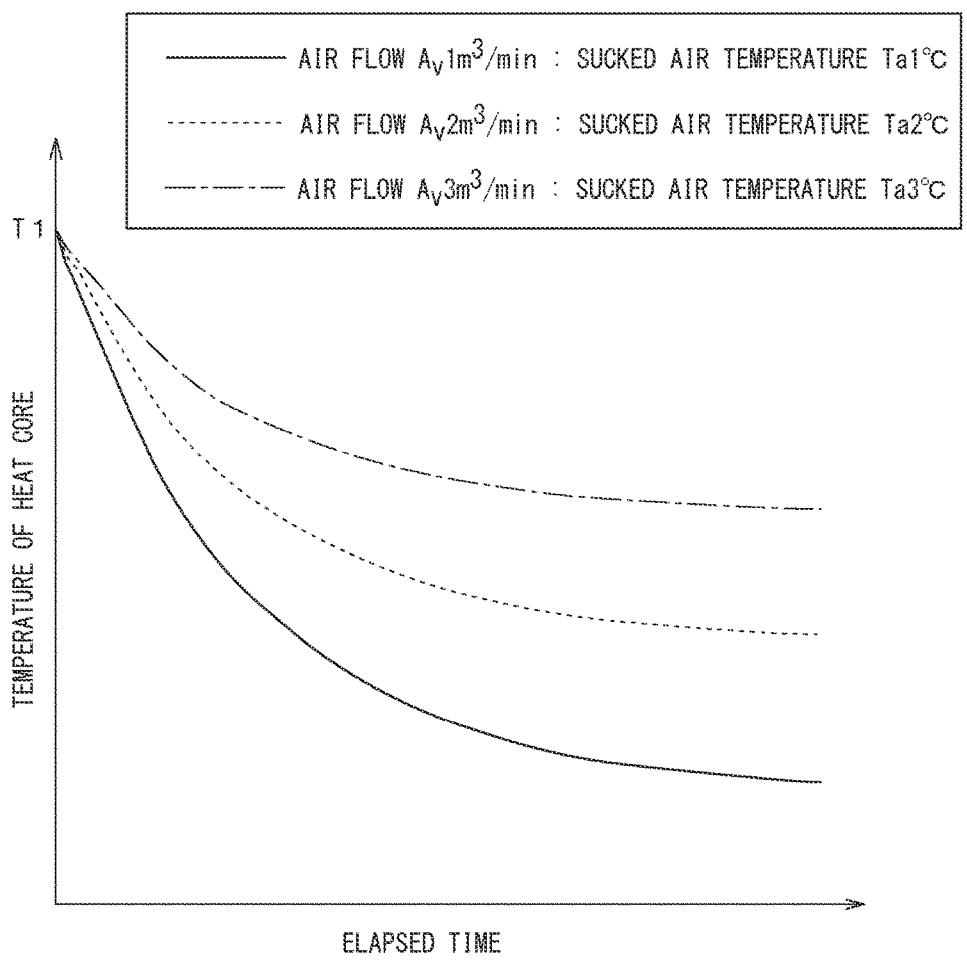
FIG. 7 is an example of map used for calculation of temperature decrease amount.

FIG. 7 illustrates examples of map used for calculating the temperature decrease amount ΔT. When the temperature of the heater core 55 at the start of the first inertial traveling is approximately constant and can be estimated, the temperature decrease amount ΔT can be calculated by using a map indicating temporal change in the temperature of the heater core 55 which starts from a known initial temperature T1 and decreases after the start of the first inertial traveling.

The solid line indicates a temporal change for the temperature Ta and the air flow rate Av being Ta1 degrees and Av1 m³/min, respectively, the broken line indicates a temporal change for the temperature Ta and air flow rate Av being Ta2 degrees and Av2 m³/min, respectively, and the dot-dash line indicates a temporal change for the temperature Ta and the air flow rate Av being Ta3 degrees and Av3 m³/min, respectively. These maps can be determined in advance, for example, by an experiment and stored in a storage device provided in the engine control unit 20.

The temperature decrease amount calculation unit 74 refers to a map corresponding to the temperature Ta and the air flow rate Av and calculates the temperature decrease amount ΔT from the initial temperature T1 at each time, on the basis of the referred map and elapsed time from the start of the first inertial traveling.

In an additional embodiment, the temperature decrease amount calculation unit 74 may calculate the value of temperature decrease amount ΔT, on the basis of a relational expression among the temperature Ta of intake air, the air flow rate Av of the blower 57, the elapsed time from the start of the first inertial traveling, and the temperature decrease amount ΔT from the known initial temperature T1 of the heater core 55 at the start of the first inertial traveling.

The temperature decrease amount calculation unit 74 measures the temperature decrease amount ΔT occurring in the heater core 55, on the basis of the air flow rate Av of the blower 57 sucking air into the air conditioning unit case 56 which houses the heater core 55 and the temperature Ta of the air sucked into the air conditioning unit case 56 by the blower 57. As a result, a dedicated sensor for measuring directly the temperature of the heater core 55 is not required, and therefore, increase in manufacturing costs associated with the additional dedicated sensor can be avoided.

Modified Example

Since the temperature change of the heater core 55 steepens with the increase in the air flow rate Av of the blower 57, the temperature decrease amount ΔT estimated from the temperature Ta of intake air and the air flow rate Av of the blower 57 tends to deviate from an actual temperature decrease value. When the temperature decrease amount calculation unit 74 erroneously predicts a temperature decrease amount ΔT lower than the actual value, the first inertial traveling will not be stopped, making thermal distortion of parts of the heater core 55 likely to occur, even if the actual temperature decrease amount exceeds the threshold Tt.

Therefore, when the air flow rate Av of the blower 57 is large, the threshold Tt can be changed to facilitate the first inertial traveling to be stopped, thereby preventing erroneous continuation of the first inertial traveling even if the estimated temperature decrease amount ΔT deviates from the actual value.

For example, the vehicle traveling control device 70 is provided with a threshold changing unit 76 for changing the threshold Tt according to the air flow rate Av of the blower 57. For example, the threshold changing unit 76 decreases the threshold Tt with increase in air flow rate Av of the blower 57.

The description is made herein while referring to the limited number of embodiments. However, the scope of rights is not limited to these, and those skilled in the art will recognize that modifications of the respective embodiments, which are based on the above-described disclosure are within a scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 . . . vehicle, 2 . . . accelerator, 2a . . . rotational speed sensor, 3 . . . torque converter, 4 . . . continuously variable transmission, 5 . . . differential gear, 6a to 6b . . . drive wheel, 7 . . . motor, 8 . . . alternator, 9 . . . battery, 10 . . . lock-up clutch, 11 . . . forward and backward switching mechanism, 12 . . . primary pulley, 13 . . . secondary pulley, 14 . . . belt, 15 . . . oil pump, 16 . . . forward clutch, 17 . . . reverse brake, 18 . . . electric oil pump, 19 . . . rotational speed sensor, 20 . . . engine control unit, 21 . . . brake pedal, 22 . . . brake switch, 23 . . . accelerator pedal, 24 . . . accelerator pedal opening degree sensor, 25 . . . master cylinder, 26 . . . master cylinder pressure sensor, 27 . . . master back, 28 . . . negative pressure sensor, 29a to 29b . . . wheel speed sensor, 30 . . . transmission control unit, 31 . . . air conditioning control unit, 40 . . . engine cooling device, 41 . . . water jacket, 42 . . . water pump, 43 . . . radiator, 44 . . . fan, 50 . . . air conditioning device, 51 . . . compressor, 52 . . . outdoor heat exchanger, 53 . . . expansion valve, 54 . . . evaporator, 55 . . . heater core, 56 . . . air conditioning unit case, 57 . . . blower, 58 . . . fan motor, 59 . . . intake door, 60 . . . temperature control door, 61 . . . bypass, 62 . . . heater, 63 . . . temperature sensor, 70 . . . vehicle traveling control device, 71 . . . idle stop control unit, 72 . . . inertial traveling control unit, 73 . . . engine controller, 74 . . . temperature decrease amount calculation unit, 75 . . . inertial traveling stop unit, 76 . . . threshold changing unit

The invention claimed is:
1. A vehicle traveling control method comprising:
starting, when a predetermined condition is satisfied, inertial traveling during which a vehicle travels while stopping fuel supply to an engine of the vehicle;
measuring, from a start of the inertial traveling, a temperature decrease amount occurring in a heat exchanger for heating a cabin of the vehicle with heat generated by the engine; and
stopping the inertial traveling when the temperature decrease amount is greater than a threshold.
2. The vehicle traveling control method according to claim 1, wherein the threshold is changed according to at least one of a decrease rate of temperature of the heat exchanger and a cumulative number of stops of the engine.

3. The vehicle traveling control method according to claim 1, wherein the temperature decrease amount is measured based on both an air flow rate of a blower sucking air into a case for housing the heat exchanger, and a temperature of the air sucked into the case by the blower.

4. The vehicle traveling control method according to claim 3, wherein the threshold is changed according to the air flow rate of the blower.

5. A vehicle traveling control device including:
- a sensor that measures a temperature decrease occurring in a heat exchanger for heating a cabin of a vehicle with heat generated by an engine; and
- a controller programmed to stop inertial traveling during which the vehicle travels while stopping fuel supply to the engine, when the temperature decrease amount occurring in the heat exchanger from start of the inertial traveling is larger than a threshold.

* * * * *